(12) United States Patent
Johnson

(10) Patent No.: US 8,182,019 B1
(45) Date of Patent: May 22, 2012

(54) SEMITRAILER TARPAULIN SECURING SYSTEM

(76) Inventor: Dennis Johnson, Clark, SD (US)

( * ) Notice: Subject to any disclaimer, the term of this patent is extended or adjusted under 35 U.S.C. 154(b) by 252 days.

(21) Appl. No.: 12/582,988

(22) Filed: Oct. 21, 2009

(51) Int. Cl.
*B60P 7/04* (2006.01)
(52) U.S. Cl. .......................................................... 296/98
(58) Field of Classification Search .................... 296/40, 296/98, 100.01, 100.04, 100.12, 100.18, 296/101, 104, 105, 118, 136.1, 136.11, 136.12
See application file for complete search history.

(56) References Cited

U.S. PATENT DOCUMENTS

| | | | |
|---|---|---|---|
| 2,853,340 A | 9/1958 | Hershberger | |
| 2,985,118 A | 5/1961 | Haharick | |
| 3,327,649 A | 6/1967 | Fisher | |
| 3,342,523 A | 9/1967 | Lutgen | |
| 3,768,540 A * | 10/1973 | McSwain | 160/23.1 |
| 3,951,447 A | 4/1976 | Sharp | |
| 4,406,493 A | 9/1983 | Albrecht et al. | |
| 4,813,735 A | 3/1989 | Avitable | |
| 5,036,775 A | 8/1991 | Snead | |
| 5,054,402 A | 10/1991 | Brassell | |
| 5,294,016 A | 3/1994 | Crenshaw | |
| 6,135,537 A | 10/2000 | Giddons | |
| 6,196,604 B1 | 3/2001 | Hoh et al. | |
| 6,913,175 B2 * | 7/2005 | Martin | 224/403 |
| 2003/0090124 A1 * | 5/2003 | Nolan et al. | 296/98 |

* cited by examiner

*Primary Examiner* — Dennis Pedder
*Assistant Examiner* — Jason S Daniels

(57) ABSTRACT

A semitrailer tarpaulin securing system includes a trailer with a first lateral wall, a second lateral wall and an opening extending into an upper side of the trailer. A plurality of covering supports extends between the first and second lateral walls and across the opening. A covering is removably positionable on the supports to close the opening. Each of a plurality of retaining members has a first end, a second end and a central portion extending between the first and second ends. Each of the first ends is attached to the first lateral wall and each of the second ends is attached to the second lateral wall so that the central portion of each of the retaining members extends over the opening of the trailer. The covering is between the supports and the retaining members. The retaining members inhibit the covering from blowing off of the trailer.

7 Claims, 7 Drawing Sheets

SEMITRAILER TARPAULIN SECURING SYSTEM

BACKGROUND OF THE DISCLOSURE

Field of the Disclosure

The disclosure relates to trailer covering securing devices and more particularly pertains to a new trailer covering securing device for preventing a trailer covering for semitrailers and the like from blowing off of the trailer.

SUMMARY OF THE DISCLOSURE

An embodiment of the disclosure meets the needs presented above by generally comprising a trailer that is transportable by a tractor. The trailer has a bottom wall and a perimeter wall is attached to and extending upwardly from the bottom wall. The perimeter wall has an upper edge defining an opening into the trailer. The perimeter wall has a first lateral wall and a second lateral wall. A plurality of covering supports is attached to and extends between the first and second lateral walls adjacent to the upper edge. A covering is removably positionable on the supports to close the opening. The covering is rolled across and covers the supports to define a deployed position or rolled into a roll exposing the supports to define a stored position. Each of a plurality of retaining members has a first end, a second end and a central portion extending between the first and second ends. Each of the first ends is attached to the first lateral wall and each of the second ends is attached to the second lateral wall so that the central portion of each of the retaining members extends over the opening of the trailer. The covering is between the supports and the retaining members. The retaining members inhibit the covering from blowing off of the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
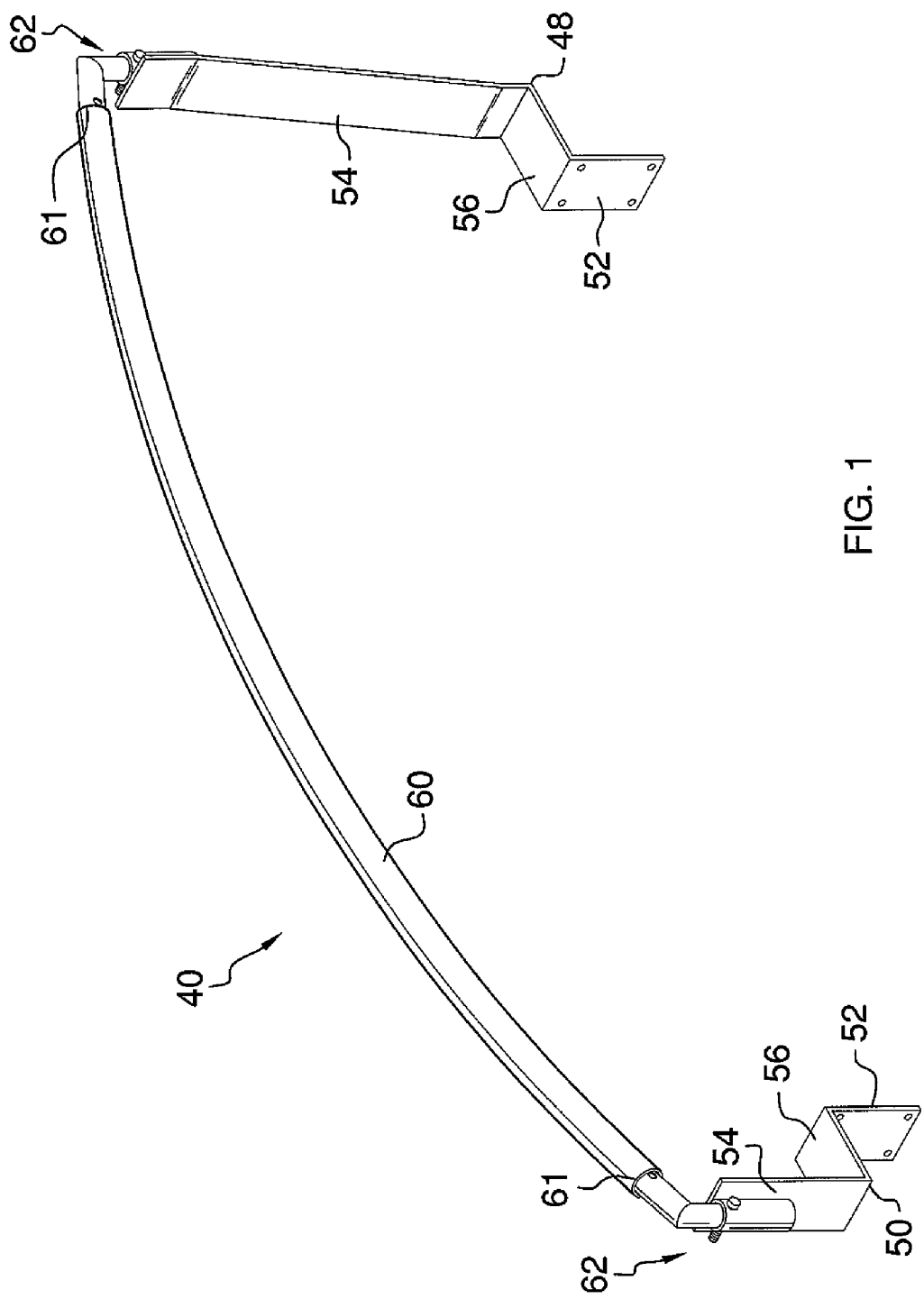
FIG. 1 is a front perspective view of a semitrailer tarpaulin securing system according to an embodiment of the disclosure.
Figure 2:
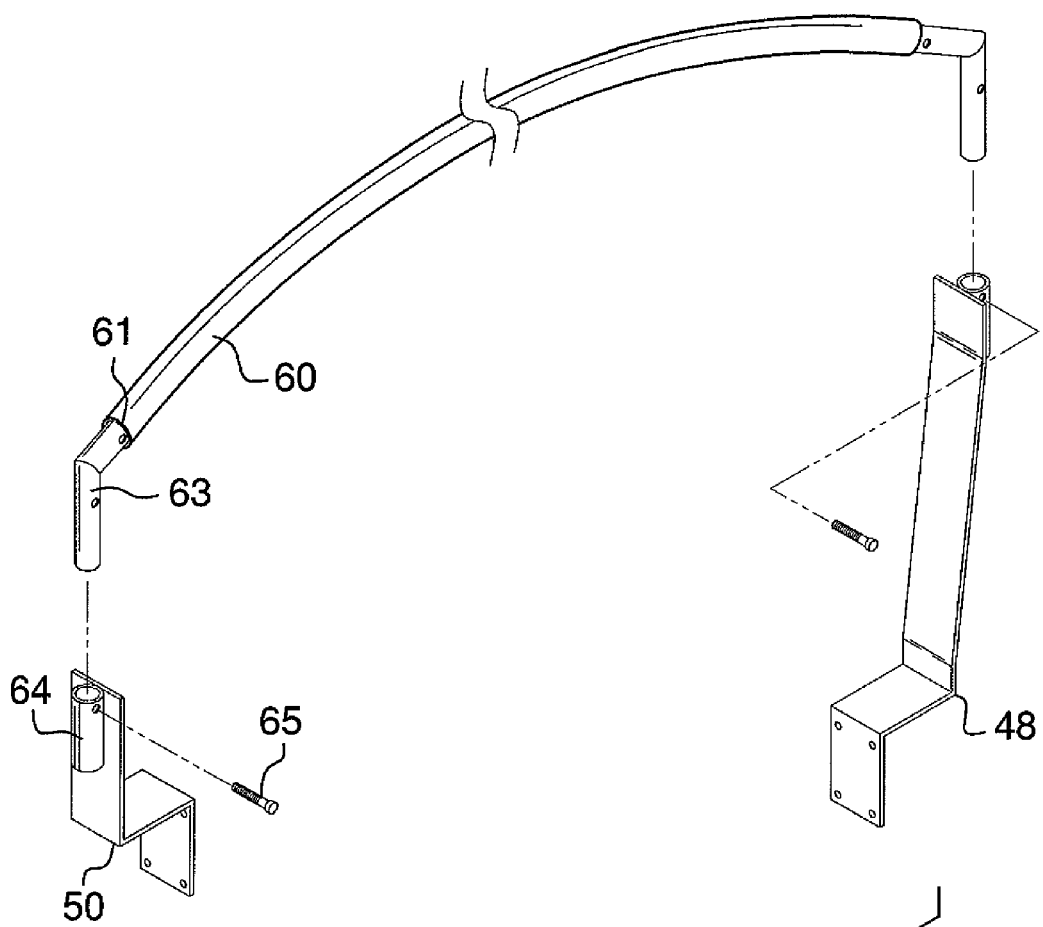
FIG. 2 is an exploded perspective view of an embodiment of the disclosure.
Figure 3:
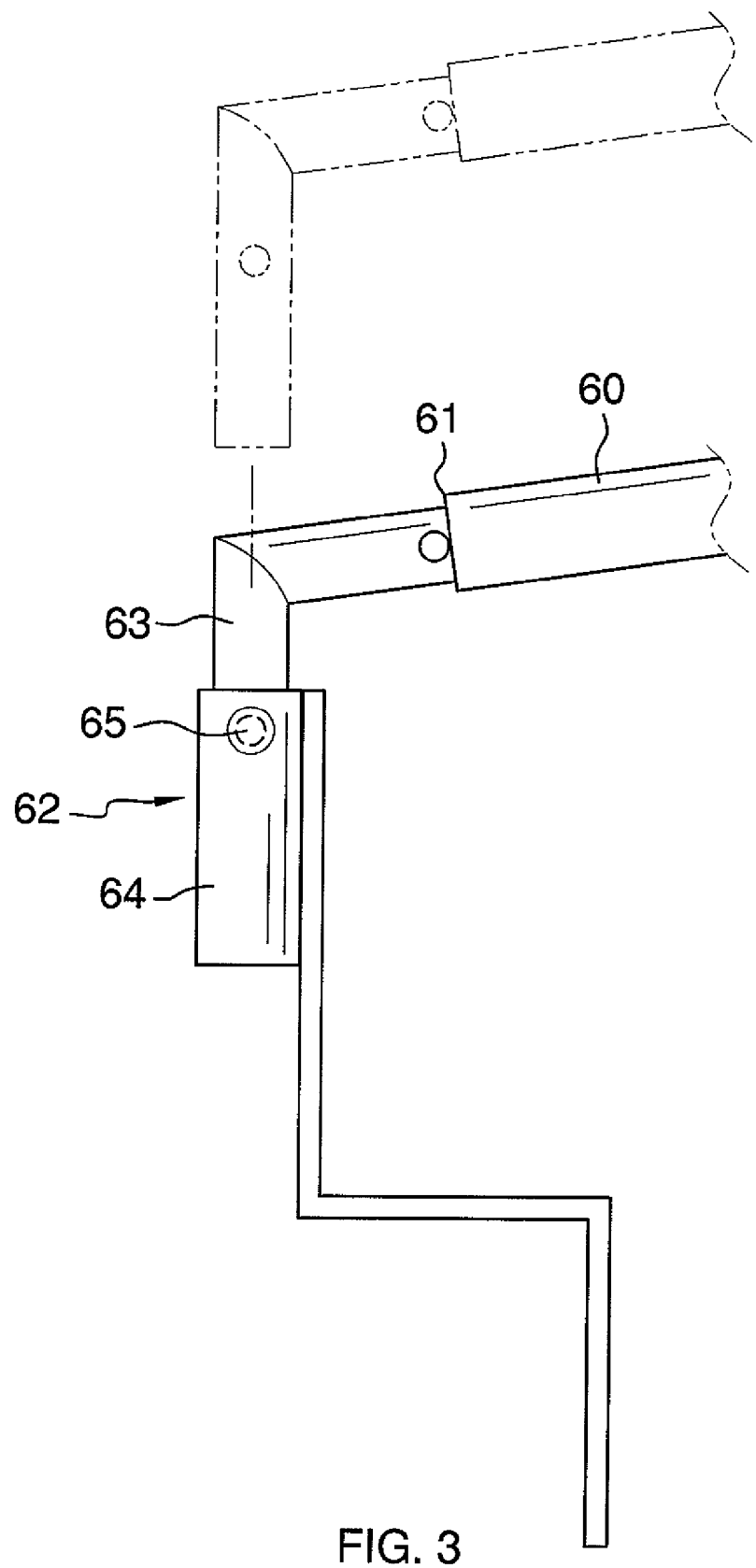
FIG. 3 is a front broken view of an embodiment of the disclosure.

With reference now to the drawings, and in particular to FIGS. 1 through 6 thereof, a new trailer covering securing device embodying the principles and concepts of an embodiment of the disclosure and generally designated by the reference numeral 10 will be described.

As best illustrated in FIGS. 1 through 6, the semitrailer tarpaulin securing system 10 generally comprises a trailer 12 that is transportable by a tractor 16. The trailer 12 is a conventional semitrailer type trailer which has a bottom wall 18 and a perimeter wall 20 that is attached to and extends upwardly from the bottom wall 18. The perimeter wall 20 has an upper edge 22 that defines an opening 14 into the trailer 12. The perimeter wall 22 has a first lateral wall 24 and a second lateral wall 26.

Figure 5A:
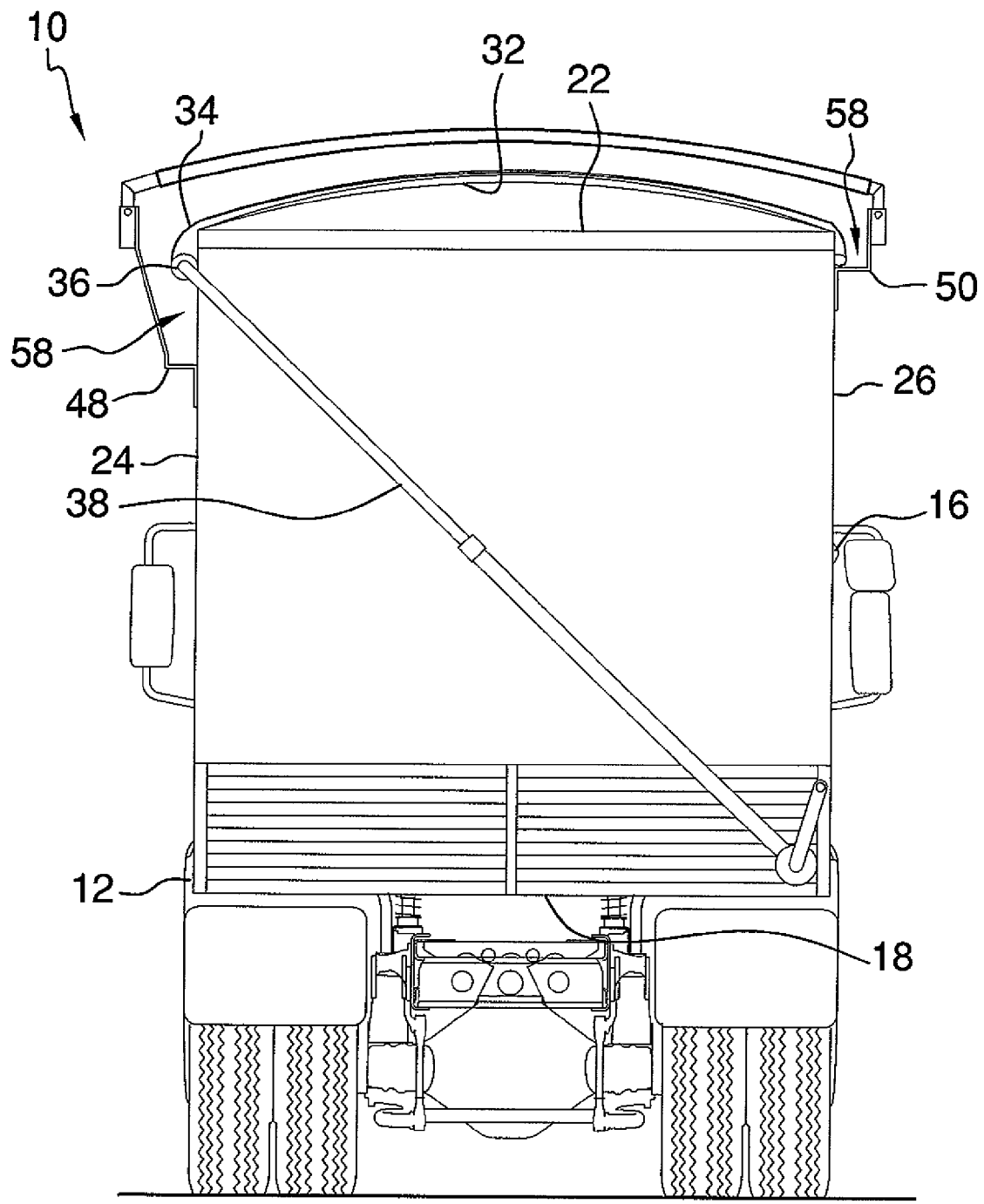
FIG. 5a is a rear view of an embodiment of the disclosure.
Figure 5B:
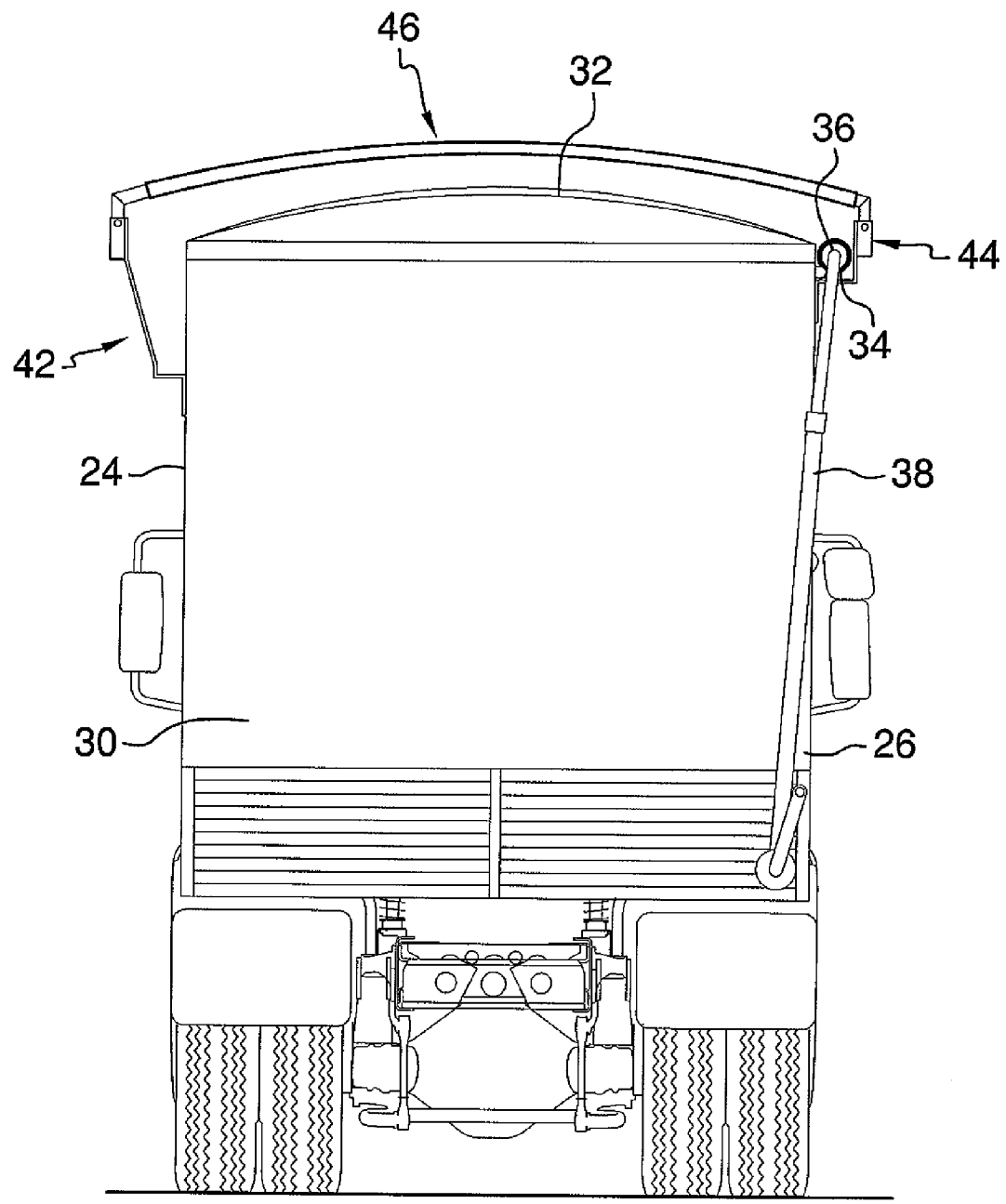
FIG. 5b is a rear view of an embodiment of the disclosure.
Figure 6:
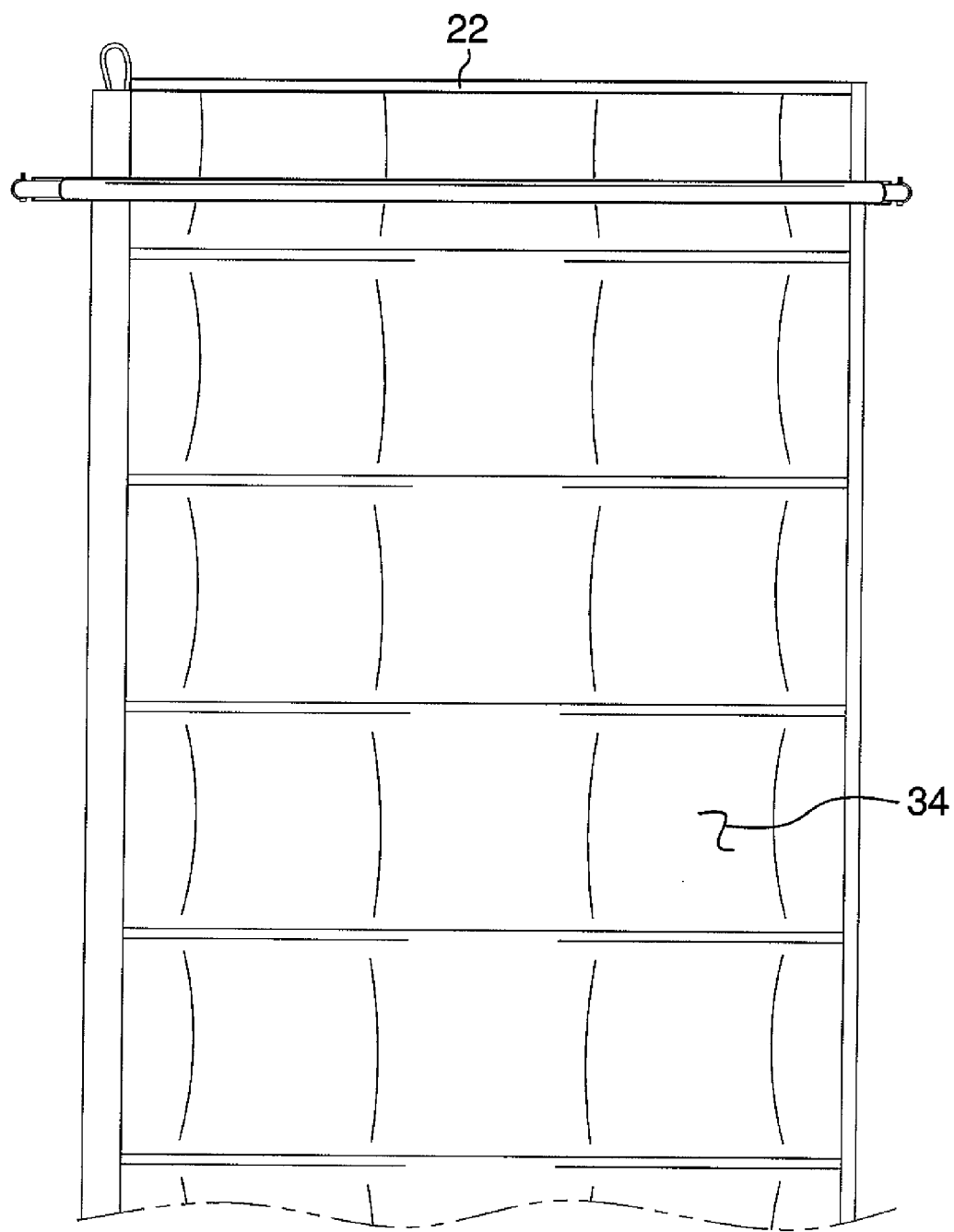
FIG. 6 is a top view of an embodiment of the disclosure.

A plurality of covering supports 32 is attached to and extends between the first 24 and second 26 lateral walls adjacent to the upper edge 20. A covering 34 is removably positionable on the supports 32 to close the opening 14. The covering 34 may comprise any conventional tarpaulin or similar material used to cover trailers and having various degrees of water resistance. The covering 34 is rolled across and covers the supports 32 to define a deployed position or rolled into a roll exposing the supports 32 to define a stored position as shown in FIG. 5b. The term "rolled" here further includes simply sliding or pulling the covering 34 over the supports. The covering 34 is rolled along the supports 32 with a roller 36 attached to an arm 38 to control the roller 36. The roller 36 is rotated as the arm 38 is moved across a back end 30 of the trailer 12. The arm 38, roller 36, covering 34 and supports 32 are conventional to semi-trailers which include an open top that is covered as needed.

A plurality of retaining members 40 is provided. Each of the retaining members 40 has a first end 42, a second end 44 and a central portion 46 extending between the first 42 and second 44 ends. The first ends 42 are each attached to the first lateral wall 24 and the second ends 44 are each attached to the second lateral wall 26 so that the central portion 46 of each of the retaining members 40 extends over the opening 14 of the trailer 12. The covering 34 is positioned between the supports 32 and the retaining members 40. The retaining members 40 inhibit the covering 34 from blowing off of the trailer 12. This can typically happen during the rolling or unrolling of the covering 34 while the covering 34 has yet to be tied down. Since the covering 34 is typically heavy, its lifting off of the trailer 12 by wind is very dangerous to persons adjacent to the trailer 12.

Each of the retaining members 40 includes a first bracket 48 having the first end 42. The first bracket 48 is attached to the first lateral wall 24. A second bracket 50 includes the second end 44 and is attached to the second lateral wall 26. Each of the first 48 and second 50 brackets includes a lower vertical section 52, an upper vertical section 54 and a central section 56 that is attached to and extends between the lower 52 and upper 54 vertical sections. The lower vertical sections 52 are attached to an associated one of the first 24 and second 26 lateral walls with conventional fasteners 55. A receiving space 58 is defined between the first 24 and second 26 lateral walls and an associated one of the upper vertical sections 54. The receiving spaces 58 receive either the roller 36 and an end of the covering 34 when the covering 34 is deployed or the covering 34 completely rolled onto the roller 36 in its stored position as shown in FIG. 5b. As can be seen in FIG. 5a, the first bracket 48 may have an elongated and outwardly angled upper vertical section 54. This is to allow the end of the covering 34 and the roller 36 to easily fall into that receiving space 58 as well as account for the swinging outwardly of the end of cover arm 38.

The retaining members 40 further include an elongated arm 60, forming the central portion 46, which has a pair of terminal ends 61. The arm 60 may be arcuate as shown in FIG. 1. A pair of couplers 62 is provided. Each of the couplers 62 releasably couples one of the terminal ends 61 to one of the first 48 and second 50 brackets. Each of the couplers 62 includes a first mating member 63 and each of the terminal ends 61 has one of the first mating members 63 attached thereto. Each of the couplers 62 includes a second mating member 64 and each of the first 48 and second 50 brackets has one of the second mating members 64 attached thereto. The second mating members 64 are positioned on an associated one of the upper vertical sections 54. The first mating members 63 may comprise posts insertable into the second mating members 64 which comprise sleeves. The first mating members 63 may then be locked in the second mating members 64 with a locking pin 65. The first mating members 63 may also be removably coupled to the arm 60.

Figure 4:
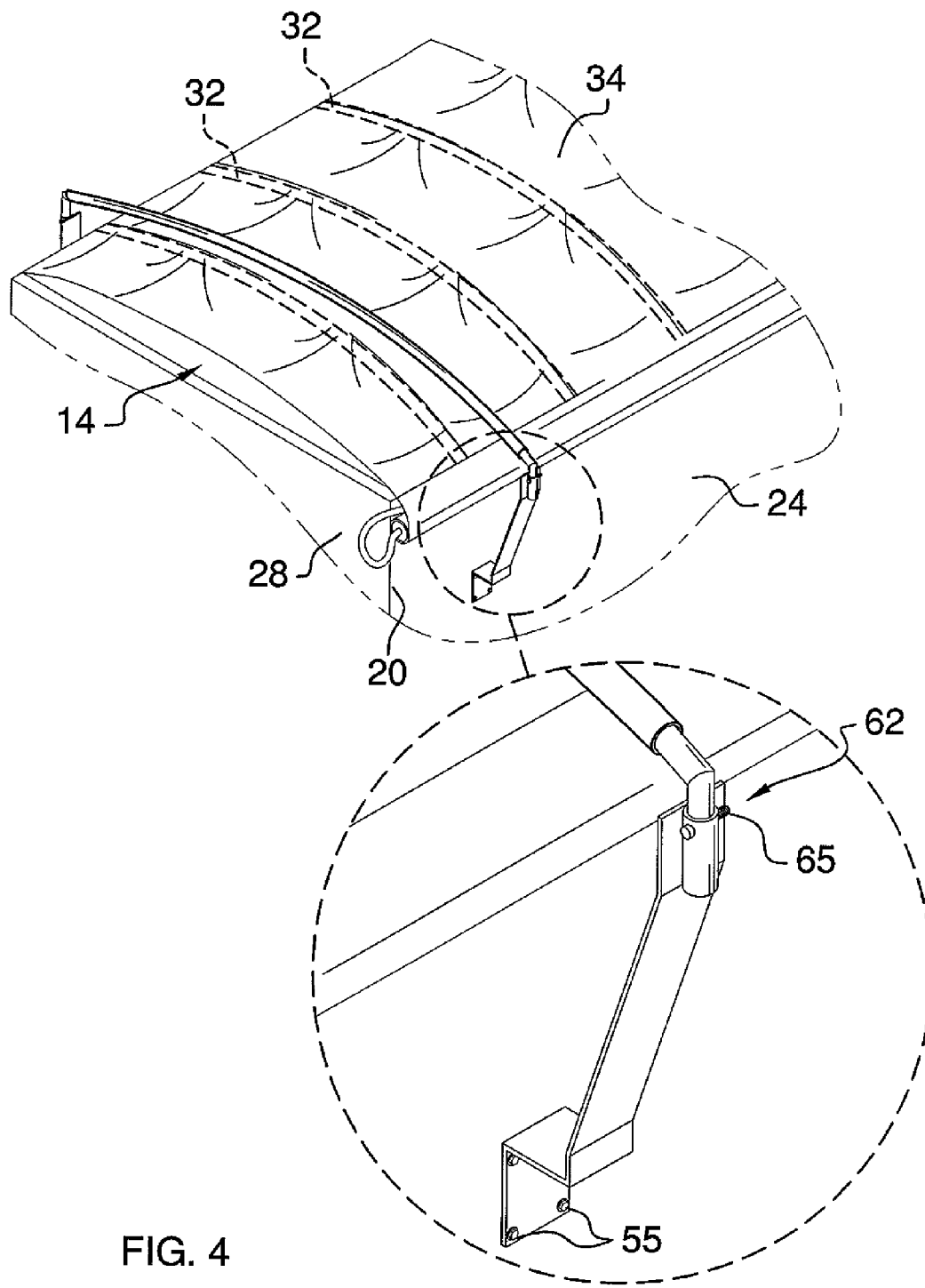
FIG. 4 is a front perspective and enlarged view of an embodiment of the disclosure.

In use, a plurality of the retaining members 40 are attached to the trailer 12 and spaced from each. As shown in FIG. 4, generally at least one of the retaining members 40 is positioned adjacent to a front end 28 of the trailer 12 while FIG. 5a shows one of the retaining members 40 adjacent to a back end 30 of the trailer 12. Additional retaining members 40 may be positioned between these two retaining members 40 depending primarily on the length of the trailer 12. The arm 60 of each of the retaining members 40 extends over the trailer 12 as shown in the Figures to prevent the covering 34 from lifting upwardly off of the supports 32 and over the side of the trailer 12. This is particularly helpful in high wind areas where extending the covering 34 over the trailer 12 is extremely difficult and dangerous and will also prevent accidents should the covering 34 come loose while the trailer 12 is being pulled down a roadway.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cover securing system comprising:
    a trailer being transportable by a tractor, said trailer having a bottom wall and a perimeter wall being attached to and extending upwardly from said bottom wall, said perimeter wall having an upper edge defining an opening into said trailer, said perimeter wall having a first lateral wall and a second lateral wall, a plurality of covering supports being attached to and extending between said first and second lateral walls adjacent to said upper edge;
    a covering being removably positionable on said supports to close said opening, said covering being positioned on a roller, said covering being rolled across and covering said supports to define a deployed position or rolled into a roll exposing said supports to define a stored position; and
    a plurality of retaining members, each of said retaining members having a first end, a second end and a central portion extending between said first and second ends, each of said first ends being attached to said first lateral wall and each of said second ends being attached to said second lateral wall so that said central portion of each of said retaining members extends over said opening of said trailer, said covering being between said supports and said retaining members, said retaining members inhibiting said covering from blowing off of said trailer, said roller being positioned between said perimeter wall and said retaining members when said roller in said deployed position.

2. The system according to claim 1, wherein each of said retaining members includes:
    a first bracket including said first end and being attached to said first lateral wall;
    a second bracket including said second end and being attached to said second lateral wall;
    an elongated arm having a pair of terminal ends; and
    a pair of couplers, each of said couplers releasably coupling one of said terminal ends to one of said first and second brackets.

3. The system according to claim 2, wherein each of said first and second brackets including a lower vertical section, an upper vertical section and a central section being attached to and extending between said lower and upper vertical sections, said lower vertical sections being attached to an associated one of said first and second lateral walls, a receiving space being defined between said first and second lateral walls and an associated one of said upper vertical sections.

4. The system according to claim 3, wherein each of said couplers including a first mating member, each of said terminal ends having one of said first mating members attached thereto, each of said couplers including a second mating member, each of said first and second brackets having one of said second mating members attached thereto.

5. A cover securing system comprising:
    a trailer being transportable by a tractor, said trailer having a bottom wall and a perimeter wall being attached to and extending upwardly from said bottom wall, said perimeter wall having an upper edge defining an opening into said trailer, said perimeter wall having a first lateral wall and a second lateral wall, a plurality of covering supports being attached to and extending between said first and second lateral walls adjacent to said upper edge;
    a covering being removably positionable on said supports to close said opening, said covering being positioned on a roller, said covering being rolled across and covering said supports to define a deployed position or rolled into a roll exposing said supports to define a stored position;
    a plurality of retaining members, each of said retaining members having a first end, a second end and a central portion extending between said first and second ends, each of said first ends being attached to said first lateral wall and each of said second ends being attached to said second lateral wall so that said central portion of each of said retaining members extends over said opening of said trailer, said covering being between said supports and said retaining members, said retaining members inhibiting said covering from blowing off of said trailer, said roller being positioned between said perimeter wall and said retaining members when said roller in said deployed position, each of said retaining members including:

a first bracket including said first end and being attached to said first lateral wall;

a second bracket including said second end and being attached to said second lateral wall, each of said first and second brackets including a lower vertical section, an upper vertical section and a central section being attached to and extending between said lower and upper vertical sections, said lower vertical sections being attached to an associated one of said first and second lateral walls, a receiving space being defined between said first and second lateral walls and an associated one of said upper vertical sections;

an elongated arm having a pair of terminal ends; and a pair of couplers, each of said couplers releasably coupling one of said terminal ends to one of said first and second brackets, each of said couplers including a first mating member, each of said terminal ends having one of said first mating members attached thereto, each of said couplers including a second mating member, each of said first and second brackets having one of said second mating members attached thereto, said second mating members being positioned on an associated one of said upper vertical sections.

6. A cover securing apparatus for a trailer having a first lateral wall, a second lateral wall and an upper edge defining an opening extending into the trailer, a plurality of supports are attached to the trailer and extend over the opening, a covering is removably positioned on the supports to cover the opening, said apparatus including:

a plurality of retaining members, each of said retaining members having a first end, a second end and a central portion extending between said first and second ends, each of said first ends being attachable to the first lateral wall and each of said second ends being attachable to the second lateral wall so that said central portion of each of said retaining members extends over the opening of the trailer and the covering is positioned between the supports and said retaining members so that said covering is inhibited from blowing off of the trailer, each of said retaining members comprising;

a first bracket including said first end and being attachable to said the lateral wall;

a second bracket including said second end and being attachable to the second lateral wall;

an elongated arm having a pair of terminal ends; and a pair of couplers, each of said couplers releasably coupling one of said terminal ends to one of said first and second brackets;

wherein each of said first and second brackets including a lower vertical section, an upper vertical section and a central section being attached to and extending between said lower and upper vertical sections, said lower vertical sections being attachable to an associated one of said first and second lateral walls, a receiving space being definable between the first and second lateral walls and an associated one of said upper vertical sections, said space being configured to receive a roller having the covering thereon.

7. The apparatus according to claim 6, wherein each of said couplers including a first mating member, each of said terminal ends having one of said first mating members attached thereto, each of said couplers including a second mating member, each of said first and second brackets having one of said second mating members attached thereto.

* * * * *